United States Patent
Maag et al.

[15] 3,698,097
[45] Oct. 17, 1972

[54] METHOD AND APPARATUS FOR TREATING GRANULAR MATERIAL

[72] Inventors: Gustav A. Maag, Crestview Hills, Ky.; Donald L. Gerth, Springfield Twsp, Hamilton County, Ohio

[73] Assignee: The Procter & Gamble Company, Cincinnati, Ohio

[22] Filed: June 14, 1971

[21] Appl. No.: 152,826

[52] U.S. Cl. ............................................34/9, 34/122
[51] Int. Cl. ..................................................F26b 3/00
[58] Field of Search....34/110, 122, 126, 9, 136, 132, 34/123

[56] References Cited

UNITED STATES PATENTS

| | | | |
|---|---|---|---|
| 2,414,580 | 1/1947 | Birdseye | 34/122 |
| 3,222,799 | 12/1965 | Taylor, Jr. | 34/122 |

*Primary Examiner*—John J. Camby
*Attorney*—Fredrick H. Braun et al.

[57] ABSTRACT

A method and apparatus for continuously treating granular material for the purpose of heating, cooling and/or drying the material. An endless belt of fine mesh fabric is supported around a treating drum having a perforated peripheral surface. The belt is moved by the rotation of the drum. A layer of granular material is continuously deposited on the surface of the moving belt. A fluid treating medium, preferably air, is continuously drawn through the belt and drum periphery whereby it passes through the granular material and simultaneously creates a sufficient pressure differential to retain the granular material on the belt as it moves through a substantial arc of rotation. The treating medium can heat, cool and/or dry the granules depending upon the desired treatment. A sealing plate is disposed in contiguous relationship to the drum periphery, either internally or externally, for that portion of its arc in which the belt does not contact the drum periphery.

16 Claims, 5 Drawing Figures

3,698,097

INVENTORS
Gustav A. Maag
Donald L. Gerth

BY *Fredrick H. Braun*

ATTORNEY

3,698,097

METHOD AND APPARATUS FOR TREATING GRANULAR MATERIAL

BACKGROUND OF THE INVENTION

The continuous heating, cooling and/or drying of granular material at substantial rates and with relatively high efficiencies has been attempted in numerous ways. However, prior methods and apparatus have been deficient in a number of respects. As an example, it has been most troublesome to treat granules having a broad range of particle sizes without causing some damage to the granules themselves. The problem is compounded when the granules are wet and sticky. Another drawback has been that the handling of granules in bulk quantities has resulted in the formation of excessive suspensions of dust in the surrounding atmosphere.

The method and apparatus for treating granular materials embodied in the hereinafter described inventive concept is entirely unique. Devices of superficial similarity have been developed and patented for the treatment of other kinds of materials. As an example of such devices, reference is made to the disclosures found in U.S. Pat. Nos. 3,380,175; 3,460,266 and 3,469,423. The cited patents, however, do not suggest the novel and non-obvious treating method and apparatus of the present invention. In general, they are specifically directed to the treatment of textiles. In no case do they suggest the use of the essential steps and/or elements of the present invention, viz. depositing and supporting the granules on an endless belt of fine mesh fabric in the course of treatment.

SUMMARY OF THE INVENTION

The nature and substance of the invention will be more readily appreciated after giving consideration to its major aims and purposes. The principal objects of the invention are recited in the ensuing paragraphs in order to provide a better appreciation of its important aspects prior to describing the details of a preferred embodiment in later portions of this description.

A major object of the invention is the provision of a method and apparatus for treating granular material in order to effect efficient heating, cooling and/or drying.

Another object of the invention is the provision of an apparatus and method of the above mentioned character which is capable of treating large quantities in a very efficient manner without causing any damage to the granules.

Still another object of the invention is the provision of a method and apparatus for treating granular material which is capable of handling granules having a wide range of particle size distribution in such a manner that it minimizes or substantially eliminates the formation of a dusty condition in the surrounding atmosphere.

A further object of the invention is the provision of a method and apparatus as previously indicated which can effectively handle granules that are sticky by nature without minimizing significantly the efficiency or the rate at which such granules are processed.

These and other objects are achieved by providing for the treatment of the granular material by first depositing the granules on a continuous, flexible, belt of fine mesh fabric which is in contiguous relationship with and driven by a treating drum having a perforated peripheral surface. A treating medium, preferably air, is continuously drawn through the belt and corresponding portion of the surface of the perforated treating drum into the interior of the drum whereupon it is withdrawn from the device and discharged. The treating medium thus passes through the granular material and creates a pressure differential which causes the granules to remain in contact with the belt as the latter rotates through a substantial arc of movement. Simultaneously, the granular material is treated by the throughflow of the treating medium causing the granules to be heated, cooled and/or dried as the granules move through a predetermined path of travel.

BRIEF DESCRIPTION OF THE DRAWING

While the specification concludes with claims particularly pointing out and distinctly claiming the subject matter regarded as forming the present invention, it is believed the invention will be better understood from the following description taken in connection with the accompanying drawing in which: pp

DESCRIPTION OF THE PREFERRED EMBODIMENT

The invention will be hereinafter described in the context of drying and cooling a wet granular material, in particular an agglomerated granular detergent material wherein the size of the granules is between about 14 and about 100 mesh. At the outset it should be understood that while the invention has great utility in the drying and cooling of agglomerated detergent granules, the invention is not limited in scope to the treatment of that particular type of product. On the contrary, the invention has broad application to the general treatment of any granular product.

As will be apparent as the description proceeds, the method and apparatus of the present invention has utility purely in the cooling of granules or simply for heating of granules or, in some cases, merely for drying. On the other hand, it can be used to carry out any two or even three or more of these operations successively.

Furthermore, and simply for convenience and simplicity, the treating medium to be described for carrying out the process in the preferred apparatus will be designated as air. It has been found that air is preferred as a treating medium although it should be understood that the invention is by no means limited to any particular treating medium. In fact, effective results can be achieved by using any gaseous or vaporous medium that might be selected in a particular situation to obtain some preferred end result.

Figure 1:
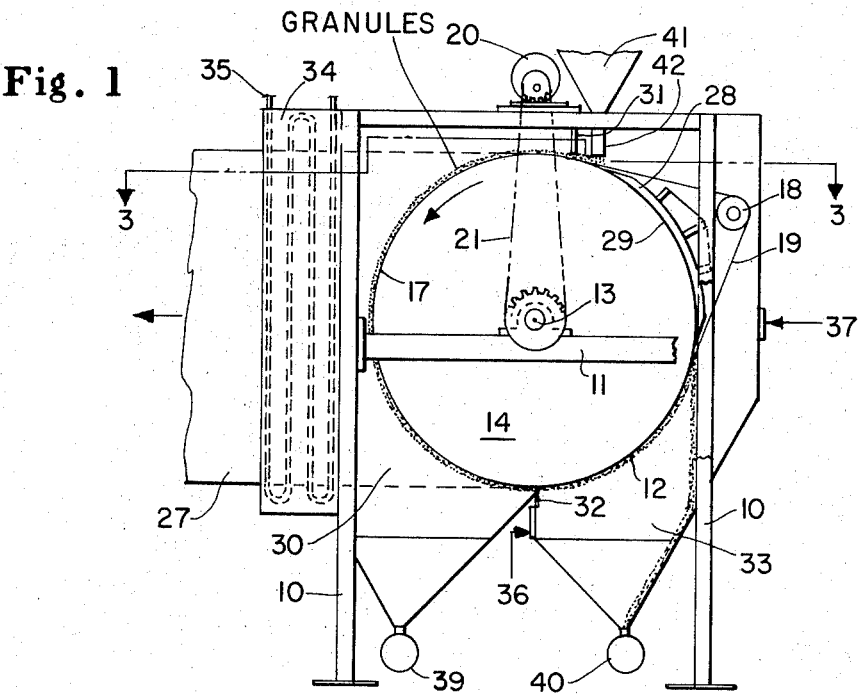
FIG. 1 is a side elevation illustrating the major components of an apparatus capable of achieving the objects of the invention.
Figure 2:
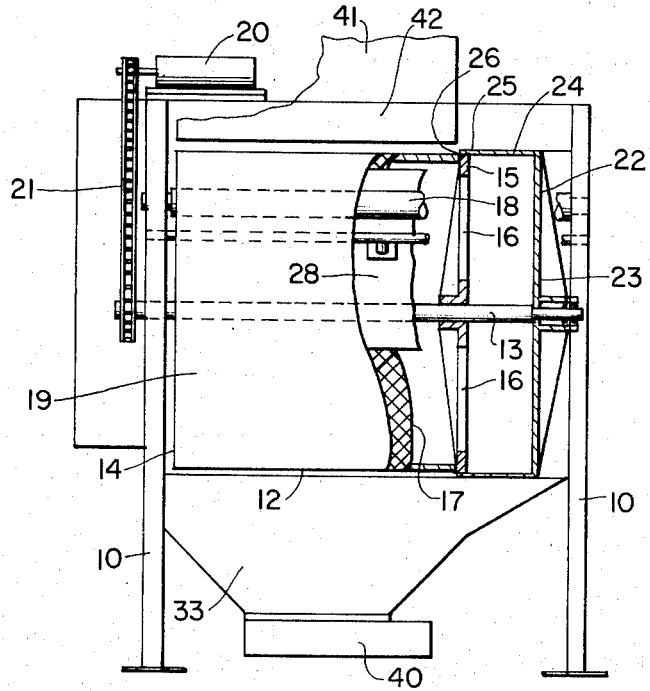
FIG. 2 is a fragmentary end elevation of the apparatus of FIG. 1 showing the detailed construction of certain of its internal components.
Figure 3:
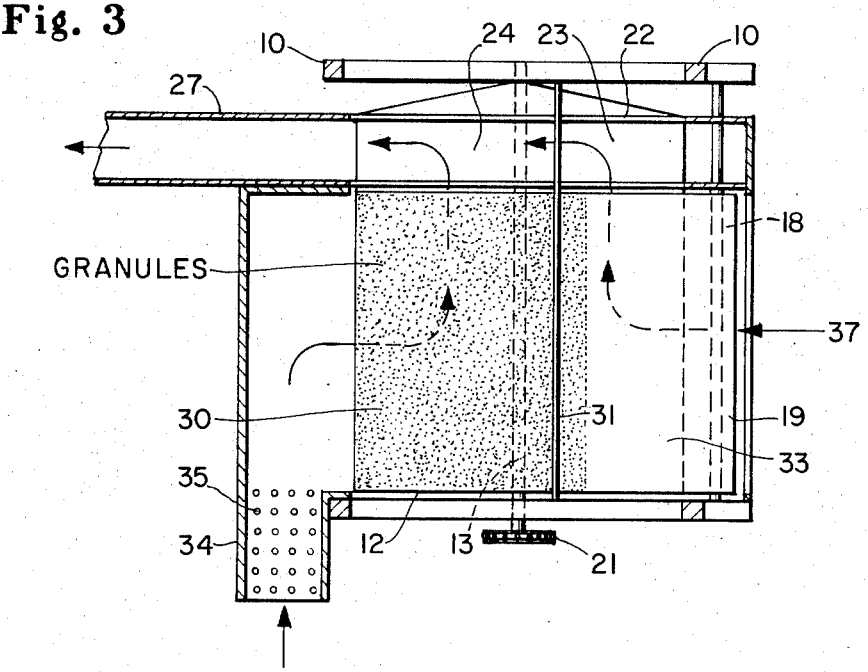
FIG. 3 is a cross section of the apparatus taken on the line 3—3 of FIG. 1.

Referring now to FIGS. 1, 2 and 3, the preferred apparatus is illustrated for carrying out a two stage process wherein granules are initially dried and then cooled by passing them first through a drying zone and then to a cooling zone. The apparatus includes a frame 10 having cross members 11 for supporting a treating drum 12 in suitable journals. The drum 12 is supported by the shaft 13 and has a solid end plate 14 at one end and an open end plate 15 at the other end. The end plate 15 is provided with a plurality of relatively large openings 16 for purposes which will become hereinafter more evident.

The treating drum 12 is provided with a perforated peripheral surface 17 which may take the form of an expanded metal material having openings averaging about 1 inch in diameter or it may be a honeycomb type structure or the like. By way of example, the drum may be constructed by the method described in U.S. Pat. No. 3,453,712 issued on July 18, 1969 to Robert G. MacKendrick, said patent being commonly owned by the assignee of the present application.

A tension roll 18 is suitably journalled in the frame 10 to permit free rotation thereof. An endless belt 19 made from a porous, flexible, fine mesh fabric material is preferably mounted for support by the tension roll 18 and is in contiguous relationship with and supported around the perforated peripheral surface 17 of the treating drum 12. The endless belt 19 is preferably of stainless steel wire mesh having openings in the range of from about 50 to about 100 mesh. Alternatively, other forms of belt material may be used. For example, a plastic polyester belt may be used such as the type that is well known for use as a forming wire of the kind commonly found on paper making machines. A motive power source 20 is provided with a suitable chain drive 21 in order to provide means to continuously rotate the treating drum 12 and thus, in turn, drive the endless belt 19 in unison therewith.

Means are provided for continuously removing air from the interior of the treating drum 12 and thus causing flow of air through the fabric belt 19. As best seen in FIGS. 2 and 3, a stationary manifold member 22 is provided having a solid end wall 23 and a solid peripheral outer wall 24. The inwardly projecting end 25 of the wall 24 is in contiguous relationship to the periphery of the end plate 15 of the treating drum 12. The latter structure forms an air flow seal at the close clearance 26 to inhibit direct flow of air from external sources into the manifold 22.

As illustrated in FIG. 3, a conduit 27 is in communication with the manifold 22. The other end of the conduit 27 is connected to a conventional blower (not shown) or the like such that air can be continuously withdrawn from the interior of the treating drum 12 to the manifold 22 and out the conduit 27 for the purpose of creating flow through the periphery of the treating drum 12 and that portion of the belt 19 that is in contiguous relationship therewith.

A stationary sealing plate 28 is provided in order to prevent inflow of air through that portion of the treating drum 12 that is not in contiguous relationship to the endless belt 19. The sealing plate 28 is supported by the frame 10 and has a sealing surface 29 which corresponds substantially to the curvature of the drum 12. Preferably the sealing plate 28 is in close proximity with minimal spacing with respect to the drum 12 although in some cases it can operate effectively when in contact with the periphery of the drum 12. The plate 28, as illustrated in FIG. 1, extends over substantially the entire area of the drum 12 that is not in contiguous relationship with the belt 19. As aforesaid, its function is to prevent inflow of air by isolating a portion of the path of travel of the drum 12. Otherwise the entire apparatus and method would be incapable of effective operation.

In the embodiment illustrated in FIGS. 1—3, the inflow of air through the belt 19 and drum 12 is divided into two zones. A drying zone 30 is defined in the space to the left of the baffles 31 and 32 as viewed in FIG. 1. A cooling zone 33 is defined in the remaining space of the device on the other side of the baffles 31 and 32. Air is delivered into the drying zone 30 through the conduit 34 (FIG. 3) wherein it passes over the steam coil 35 in order to heat the air. On entry into the drying zone 30, the air is drawn through the belt 19 and drum 12 whereupon it passes out through the manifold 22 and into the conduit 27. Similarly, cooling air is drawn through the inlets 36 and 37 into the cooling zone 33 whereupon it is drawn through the belt 19 and drum 12, into the manifold 22 and out the conduit 27. The drying zone 30 and the cooling zone 33 are each fully enclosed around the treating drum 12 as by a sheet metal housing or the like.

Suitable airlock feeding devices 39 and 40 are provided in the lower portion of the drying and cooling zones, respectively, for the purpose of conveying away any granular product that falls from the surface of the belt 19 in either zone. The feeding devices 39 and 40 simultaneously function to prevent inflow of air from an unwanted source and may take the form of well known screw feeders or the like. The details of construction of such devices will be well known to those skilled in the art.

A feed hopper 41 is mounted on the frame 10 so that its outlet 42 is in position to continuously deposit a blanket of granular material on the belt 19. Granular material is preferably deposited to a depth in the range of from about ¼ inch to 1 inch. A granules depth of about one-half inch has been found to be most effective. The flow of air through the belt 19 and drum 12 results in a pressure differential which maintains a continuous bed of granules on the belt 19 as the drum 12 rotates. In fact, it has been found that sufficient air flow through the belt 19 must be provided to obtain a minimum pressure drop or differential across the belt 19 and drum 12 of about 5 inches of water although this may be varied depending on the depth of deposited product and its characteristics.

Thus as the granules move around on the belt 19, the hot air from the drying zone 30 is drawn through the bed of granules causing them to be dried. Sufficient drying has been done when they pass the baffle 32. During the drying step, the granules tend to become overheated. It is, therefore, desirable to cool the granules and this step can be carried out with ambient air in the cooling zone 30. As the granules move through the cooling zone 33 on the belt 19, ambient air is drawn over the granules and through the belt 19 such that the granules are cooled as a second step in the treating operation.

A very small percentage of granules may fall off in the drying zone 30. These will fall by gravity and be carried off by the screw feeder 39. The remainder of the fully treated granules (dried and cooled) will drop from the belt 19 as it breaks contact with the drum 12 whereupon these granules will fall by gravity into the screw feeder 40 to be conveyed away for further processing.

An example of the treatment of a wet agglomerated granular detergent material by the use of the present method and apparatus will not be described. The detergent granules have a particle size ranging from about 14 mesh to about 100 mesh with an average particle size of 30 mesh (Tyler sieve). The treating drum is 108 inches in diameter and 102 inches long with a perforated peripheral surface 17 made from expanded metal with average opening of 1 square inch. An endless belt 19 of stainless steel fabric of about 100 mesh is contiguously mounted around the treating drum 12 and over a 9 inch diameter tension roll 18 which is on 62 inch centers with respect to the treating drum 12. The drum 12 is continuously rotated at about 1 rpm. The granular material initially contains about 20 per cent water by weight at a temperature of 70° F. and is continuously deposited on the belt 19 to a depth of about one-half inch. Drying air is heated by the steam coil 35 to a temperature of about 250° F. whereupon it enters the drying zone 30 and passes through the drum at a velocity of about 250 feet per minute. This reduces the weight of water in the granules to about 10 per cent while raising the temperature of the granules to 200° F. Thereupon, cooling air at room temperature of about 80° F. is passed through the granules in the cooling zone 33 to reduce the temperature of the granules to 90° F. The velocity of the cooling air is about 250 feet per minute. With this operation it is possible to dry and cool granules at a rate of 15,000 lbs. per hour.

Figure 4:
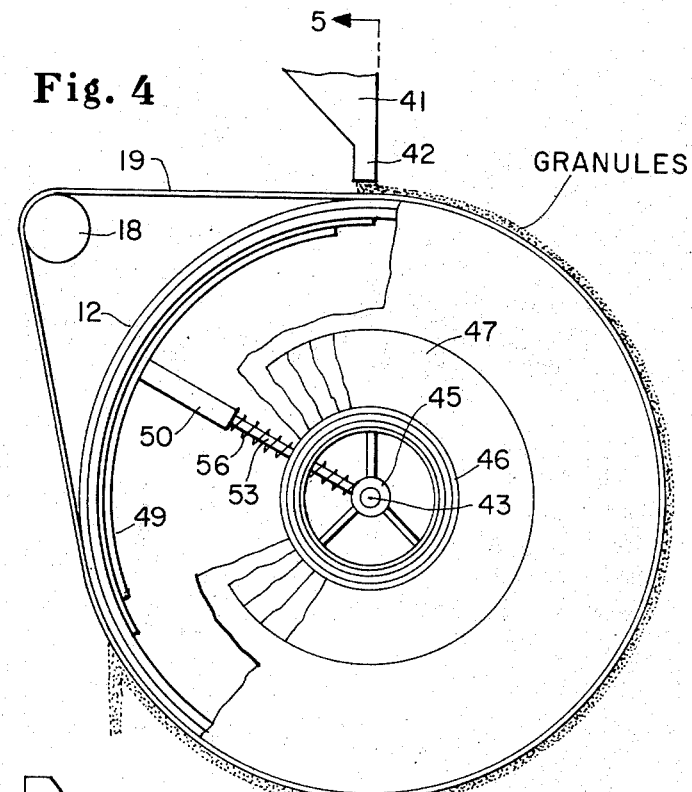
FIG. 4 is a fragmentary side elevation of an alternate embodiment of an apparatus for accomplishing the objectives of the invention.
Figure 5:
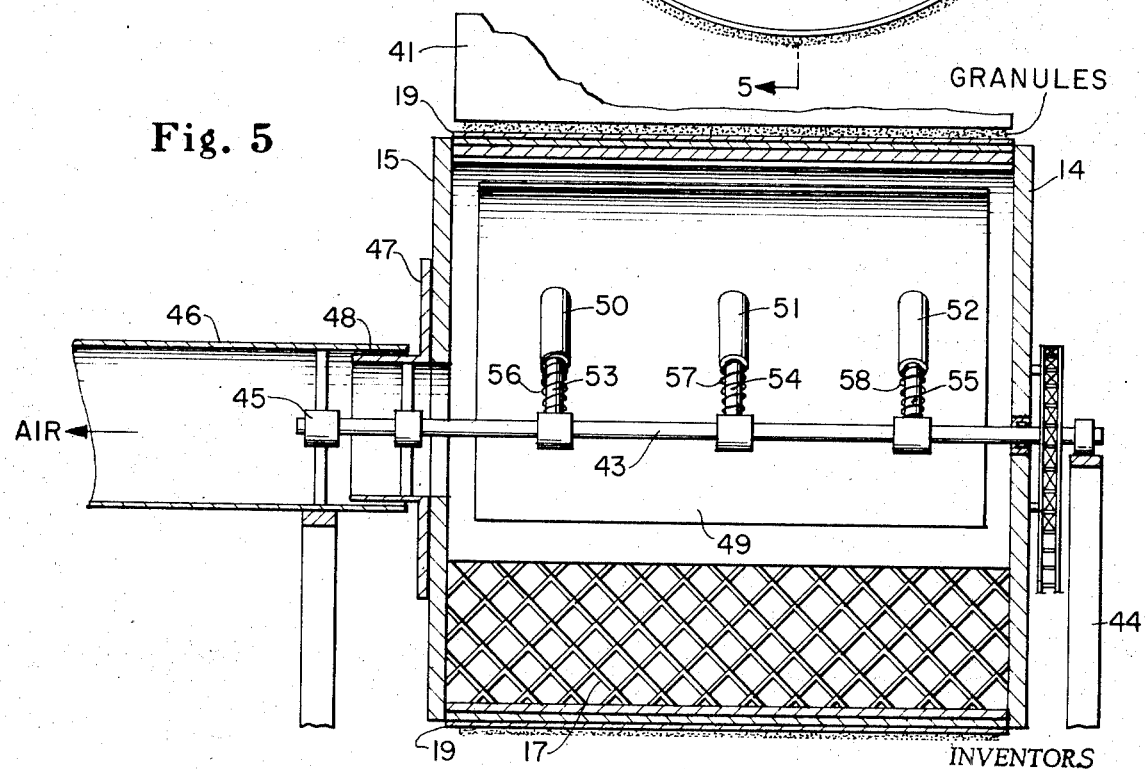
FIG. 5 is a fragmentary end elevation in cross section taken on the line 5—5 of FIG. 4.

FIGS. 4 and 5 illustrate an alternate embodiment of the apparatus wherein the sealing plate is internally mounted within the treating drum 12. In describing the details of the alternate embodiment, all parts that are similar or identical to those previously described in connection with the preferred embodiment of FIGS. 1–3 will bear like reference numerals to simplify and minimize the descriptive detail.

As seen in FIG. 5, the essential elements of the apparatus comprise the treating drum 12 having a perforated peripheral surface 17 (see FIG. 5), a tension roll 18 and an endless flexible fine mesh fabric belt 19. The drum 12 is supported from the shaft 43, one end of which is suitably journalled on the support 44, the other end being journalled in the bearing 45 supported within the stationary conduit 46. Air is withdrawn through the conduit 46 by a suitable blower (not shown) and a seal is formed between the rotating flange 47 secured to the drum 12 and the conduit 46 by means of the close annular clearance at 48.

An internal stationary sealing plate 49 is resiliently mounted from the shaft 43 by means of the radially projecting support sleeves 50, 51 and 52. The sleeves 50, 51 and 52 slidingly engage the shafts 53, 54 and 55, respectively, which in turn are rotatably mounted on the shaft 43. Springs 56, 57 and 58 provide sufficient tension against the support sleeves 50, 51 and 52, respectively, to urge and maintain the sealing plate 49 in contiguous relationship to the inner surface of the drum 12 in order to prevent inflow of air through the peripheral portion of its surface that is not in contiguous relationship to the belt 19.

The mode of operation of the embodiment of FIGS. 4 and 5 is quite similar to that of the embodiment of FIGS. 1–3. Granular material is continuously deposited from the hopper 41 whereupon it is maintained on the belt 19 by means of the vacuum effect created as the air passes inwardly through the granules, the belt 19 and the periphery of the drum 12. The air acts as a treating medium to heat, cool or dry the granules depending upon the desired result and the properties of the treating medium which is selected to achieve the desired result.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. A method for treating granular material comprising the steps of:
    a. depositing granular material on a porous flexible continuous fabric belt, said belt being in contiguous relationship with and driven by the perforated peripheral surface of a treating drum,
    b. drawing a treating medium through said belt and corresponding portion of said perforated surface of said treating drum by withdrawing the treating medium continuously from the interior of said drum,
    c. passing the treating medium through the granular material reposing on said belt in response to the withdrawal thereof from said drum to treat said granular material while simultaneously creating a pressure differential effect for holding said granular material on said belt throughout a predetermined path of travel.

2. A method for treating granular material as claimed in claim 1 including the step of controlling the deposit of granular material on said belt to a depth of from about one-fourth inch to about 1 inch.

3. A method for treating granular material as claimed in claim 1 including the step of maintaining a pressure differential of at least about 5 inches of water pressure across the belt to maintain said granules in contact with said belt in all attitudes of the belt 4. A method for treating granular material as claimed in claim 1 including the step of heating the treating medium and then drawing the treating medium through said granules in a heating zone to dry said granules, thereafter drawing a treating medium at room temperature through said granules in a cooling zone while they are still reposing on and being moved by said fabric belt.

5. A method for treating granular material as claimed in claim 2 including the step of maintaining a pressure differential of at least about 5 inches of water pressure across the belt to maintain said granules in contact with said belt in all attitudes of the belt.

6. A method for treating granular material as claimed in claim 2 including the step of heating the treating medium and then drawing the treating medium through said granules in a heating zone to dry said granules, thereafter drawing a treating medium at room temperature through said granules in a cooling zone while they are still reposing on and being moved by said fabric belt.

7. A method for treating granular material as claimed in claim 3 including the step of heating the treating medium and then drawing the treating medium through said granules in a heating zone to dry said granules, thereafter drawing a treating medium at room temperature through said granules in a cooling zone while they are still reposing on and being moved by said fabric belt.

8. A method for treating granular material as claimed in claim 5 including the step of heating the treating medium and then drawing the treating medium through said granules in a heating zone to dry said granules, thereafter drawing a treating medium at room temperature through said granules in a cooling zone while they are still reposing on and being moved by said fabric belt.

9. Apparatus for treating granular material comprising:
   a. a treating drum having a perforated peripheral surface, said drum being fully enclosed at one end and having an opening at the other end,
   b. means for rotating said drum,
   c. a porous, flexible endless belt of fine mesh fabric in contiguous relationship with a substantial portion of said perforated surface of said drum and moving in unison therewith,
   d. means for withdrawing a treating medium from the interior of said drum through said opening and thereby causing flow of treating medium through the porous, flexible endless belt, and
   e. a stationary sealing plate proximately mounted with respect to said drum to isolate a portion of the path of travel of the peripheral surface of said drum to prevent throughflow of treating medium during the rotation of said drum through that portion of the path of travel of the peripheral surface.

10. Apparatus for treating granular material as claimed in claim 9 including means for continuously depositing granular material on said belt to a depth of from about ¼ inch to about 1 inch.

11. Apparatus for treating granular material as claimed in claim 9 including means for creating a pressure differential of at least about 5 inches of water pressure across the belt to maintain granules in contact with said belt at all attitudes of the belt.

12. Apparatus for treating granular material as claimed in claim 9 including a heating zone and a cooling zone formed by a pair of radially extending baffle means in predetermined positions around the periphery of said treating drum and means for heating the treating medium prior to passage thereof into said heating zone.

13. Apparatus for treating granular material as claimed in claim 10 including means for creating a pressure differential of at least about 5 inches of water pressure across the belt to maintain granules in contact with said belt at all attitudes of the belt.

14. Apparatus for treating granular material as claimed in claim 10 including a heating zone and a cooling zone formed by a pair of radially extending baffle means in predetermined positions around the periphery of said treating drum and means for heating the treating medium prior to passage thereof into said heating zone.

15. Apparatus for treating granular material as claimed in claim 11 including a heating zone and a cooling zone formed by a pair of radially extending baffle means in predetermined positions around the periphery of said treating drum and means for heating the treating medium prior to passage thereof into said heating zone.

16. Apparatus for treating granular material as claimed in claim 13 including a heating zone and a cooling zone formed by a pair of radially extending baffle means in predetermined positions around the periphery of said treating drum and means for heating the treating medium prior to passage thereof into said heating zone.

* * * * *